(12) United States Patent
Burns (10) Patent No.: US 8,408,320 B2
(45) Date of Patent: Apr. 2, 2013

(54) EXTENSION THERAPEUTIC HORSESHOE

(76) Inventor: Curtis J. Burns, Wellington, FL (US)

(*) Notice: Subject to any disclaimer, the term of this patent is extended or adjusted under 35 U.S.C. 154(b) by 337 days.

(21) Appl. No.: 12/806,244

(22) Filed: Aug. 6, 2010

(65) Prior Publication Data

US 2010/0300706 A1 Dec. 2, 2010

Related U.S. Application Data

(63) Continuation-in-part of application No. 11/481,438, filed on Jul. 6, 2006, now Pat. No. 7,793,734.

(51) Int. Cl.
*A01L 5/00* (2006.01)
*A01L 3/02* (2006.01)

(52) U.S. Cl. .............................. 168/4; 168/12

(58) Field of Classification Search ............... 168/12–14, 168/26, 28
See application file for complete search history.

(56) References Cited

U.S. PATENT DOCUMENTS

| | | | |
|---|---|---|---|
| 553,586 A | 1/1896 | Kent | |
| 676,894 A | 6/1901 | Higgins | |
| 760,924 A | 5/1904 | Sandifer | |
| 773,734 A | 11/1904 | Griffiths | |
| 778,909 A | 1/1905 | Simmons | |
| 779,757 A * | 1/1905 | Bartley | 168/13 |
| 826,900 A | 7/1906 | O'Brien | |
| 826,958 A | 7/1906 | O'Brien | |
| 826,959 A | 7/1906 | O'Brien | |
| 3,285,346 A | 11/1966 | Jenny et al. | |
| 3,302,723 A | 2/1967 | Renkenberger et al. | |
| 3,519,079 A | 7/1970 | Bieber | |
| 3,603,402 A | 9/1971 | McDonnell | |
| 4,206,811 A | 6/1980 | Dallmer | |
| 4,496,002 A | 1/1985 | Jones et al. | |
| 4,513,824 A | 4/1985 | Ford | |
| 4,605,071 A | 8/1986 | McKibben | |
| 4,690,222 A | 9/1987 | Cameron | |
| 4,765,412 A | 8/1988 | Colonel et al. | |
| 4,889,188 A | 12/1989 | Anderson | |
| 4,892,150 A | 1/1990 | Thoman | |
| 4,972,909 A | 11/1990 | Rose | |
| 5,060,641 A | 10/1991 | Jones | |
| 5,069,289 A | 12/1991 | Schaffer | |
| 5,105,891 A * | 4/1992 | Noffsinger | 168/13 |
| 5,137,092 A | 8/1992 | Tuunanen | |

(Continued)

FOREIGN PATENT DOCUMENTS

EP 0445056 A1 4/1991

OTHER PUBLICATIONS

Articles and Information, Shoeing and care considerations for foals, From the Hoofcare and Lameness Archives, Second Bluegrass Laminitis Symposium, Jan. 1987, Lexington, Kentucky, 6 pages.

(Continued)

*Primary Examiner* — Son T Nguyen
(74) *Attorney, Agent, or Firm* — Alfred M. Walker; John F. Vodopia (57) ABSTRACT

A therapeutic extension horseshoe is formed in a substantially u-shape from a resilient, flexile moldable material. A pliable, metal rod-like reinforcer is shaped to include an anterior segment from which opposing side segments continuously extend to caudal ends separated as an open heel. Ungulate and contact surfaces are formed to include an extension to one of said opposing side segments, which extension acts as an additional load bearing surface portion to facilitate a modification of a posture of a horse shod therewith. At least one wear insert is arranged in the extended load bearing surface portion to minimize surface wear to the moldable material. Depending on its orientation, the therapeutic extension horseshoe may be used to provide a lateral extension or a medial extension.

5 Claims, 4 Drawing Sheets

U.S. PATENT DOCUMENTS

| | | |
|---|---|---|
| 5,165,481 A | 11/1992 | Duckett |
| 5,172,766 A | 12/1992 | Adkins |
| 5,320,184 A | 6/1994 | Noffsinger |
| 5,330,008 A | 7/1994 | Sigafoos et al. |
| 5,348,098 A | 9/1994 | DiGiulio |
| 5,638,905 A | 6/1997 | Sigafoos et al. |
| 5,692,569 A | 12/1997 | Constantino et al. |
| 5,699,861 A | 12/1997 | Sigafoos |
| 6,076,607 A | 6/2000 | Bergeleen |
| 6,082,462 A | 7/2000 | Lyden |
| 6,116,346 A | 9/2000 | Hasegawa |
| 6,349,773 B1 | 2/2002 | Logan |
| 6,497,293 B1 | 12/2002 | Miller |
| D483,530 S | 12/2003 | Bruns |
| 6,688,401 B2 | 2/2004 | Smith |
| 6,732,807 B2 | 5/2004 | Poynton |
| 6,843,323 B2 | 1/2005 | Poynton |
| 6,868,914 B2 | 3/2005 | Kolonia, Sr. |
| 6,915,859 B2 | 7/2005 | Craig et al. |
| 7,793,734 B2 | 9/2010 | Burns |
| 2004/0035592 A1 | 2/2004 | Kolonia, Sr. |
| 2005/0236165 A1 | 10/2005 | Yates et al. |

OTHER PUBLICATIONS

O'Grady, Stephen E; DVM, MRCVS, Equine Podiatry, Angular Limb and Flexure Deformities in Foals, Building a Foundation, Northern Virginia Equine, 2003, 3 pages.

Sellnow, Les; On the Forehand, The Horse magazine, 2006, 6 pages.

Morrison, DVM, Scott; Foal Foot Care, CanWest Veterinary Conference, 2009, 8 pages.

\* cited by examiner

EXTENSION THERAPEUTIC HORSESHOE

CROSS-REFERENCE TO RELATED APPLICATION

This application is a continuation-in-part (CIP) application of U.S. patent application Ser. No. 11/481,438, filed Jul. 6, 2006 ("the parent"); this CIP application claims priority from the parent under 35 USC §120, which parent claims priority under 35 USC §120 from U.S. Provisional Patent Application 60/697,414 filed Jul. 8, 2005.

BACKGROUND OF THE INVENTION

The present invention broadly relates to protective coverings for equine hooves and, more particularly relates to a therapeutic extension horseshoe made from non-metallic polymeric material that comprises a medial or lateral extension that is intended for use on foals or young stock with limb development problems, for example, angular deformities, and a method of manufacturing same.

Wild horses rarely suffer from lameness unless they are injured in some way. This is true mainly due to the fact that they are constantly on the move, run on uneven ground, stand in water and otherwise are exposed to environmental factors which wear away the hoof in the manner in which nature intended. The hoof mechanism in its natural state is designed to be a shock absorber as well as a vital aid to the circulatory system. When in motion, on contact with the ground surface, the digital cushion is compressed between the pastern bone and the sensitive frog and redirects the remainder of the force outwards and upwards to the lateral cartilages (attached to the sides of the coffin bone). The foot will expand and the sole will widen, this expansion absorbs shock and also permits the coffin bone to lower which in turn brings blood flow to the area. As the foot is lifted in stride it contracts forcing the blood out of the foot and up the leg as the foot hits the ground on the next stride. Not only does the entire structure of the foot benefit from increased circulation this process is fundamental for the health and well being of the horse.

Domesticated horses are not so lucky. They are exposed to much less uneven terrain and spend a great deal more time confined to stalls where movement is prohibited as the average stall is 11'×11'. They are protected from the more harsh and abrasive aspects of nature. Furthermore, special feeds which create other desirable conditions in domesticated horses may have a harmful effect on the feet. Therefore, it has long been recognized that special care is required to maintain domesticated horses' feet in proper condition. Horseshoes are used for this purpose.

Traditionally over the years most domesticated horses have been and are currently shod with shoes made of metal such as steel or aluminum alloys.

Horseshoes are typically secured to hooves by nails. The nails pass through holes in a horseshoe and are driven into the horn wall of the hoof, or hard keratinous portion. Great care must be taken in directing the nail into the hard keratinous portion so as to prevent injury to the horse. The nails are driven at an angle away from the center of the hoof, the nail points extend through the outer side wall of the hoof where they are cut off and clinched or hammered against the hoof.

Aluminum alloys are most commonly used today in racing and are characterized by efficient application, relatively low weight and expense. Horses engaged in competition training or racing are commonly re shod every three to six weeks depending on the individual's hoof growth. This is done in consideration of the weakened clinches (nails), but primarily by the desire to maintain healthy geometry with respect to the configuration of the foot and so facilitate optimal biomechanics, or way of going. As a result of the natural flexion and movement of the foot over time the nails work loose and the clinches become raised, which can often lead to a horse dislodging a shoe or shoes. This event can result in damage to the hoof wall when the clinched nails are pulled through the wall of the hoof or more disastrous if the shoe is not pulled off cleanly the horse may step on exposed nail ends damaging the sole or frog or further damage a leg with the dislodged shoe.

Frequent removal and reattachment of shoes makes numerous nail holes in the hoof walls. There is always a possibility of error when driving a nail, if driven too close to the white line it can be very painful for a horse leading to lameness and possibly abscesses. If there is insufficient new healthy horn growth two problems arise. First, with numerous nail holes already in the hoof wall, it can be difficult or sometimes impossible to secure a new shoe. Second, the abundance of nail holes lets in bacteria, dries out the hoof wall, damages the corium (vascular tissue that supplies nourishment to the hoof) and generally weakens the hoof structure, which can lead to failure of the wall and damage to the horse's hoof and foot. Thus, the well known phrase, no foot no horse, prevails.

The surfaces on which horses train and perform vary widely. Horses frequently train and compete on grass, dirt, sand, cinder, crushed stone, and sometimes on packed surfaces which nearly approach the hardness of asphalt or cement. The hardness of the training or racing surfaces can greatly increase the effective rate of loading, thus the shock and vibration, e.g., the peak g forces which the horse will experience. The shock and vibration transmitted to a horse's anatomy is intensified by metal shoes and can directly affect a horse's efficiency, athletic performance and the amount of trauma that will be experienced.

Accordingly, it can be readily understood that the potential for injury is large whenever horses train or race on hard surfaces. Horses are best trained by placing them into open paddocks and training them on forgiving yet not unstable natural surfaces. Clearly, no single factor can so greatly affect the level of stress being placed upon a horse, as can the training or racing surface and overall training program. In Thoroughbred or Standardbred racing, trainers have very few alternatives other than utilizing a racetrack for daily training.

It is known that the foot of an active unshod horse living in a natural environment will wear such that the front and back of the hoof become gently rounded. In fact, horseshoes which are initially substantially rectangular in cross-section will wear in these areas and eventually enable the combination of a horse's foot and horseshoe to assume a somewhat similar shape. Unfortunately, many conventional horseshoes are so constructed as to require replacement by the time this more natural configuration is attained.

It is also known that the hoof of an active unshod horse living in a natural environment will assume a slightly concave shape in the toe area between the medial and lateral sides, as when viewed from the front, but also along both sides of the hoof between the toe and heel. This configuration permits the hoof to better slide or plane over the ground support surface during the braking phase as impact takes place, thereby reducing the effective rate of loading and the shock and vibration experienced.

Further, this configuration permits the hoof to better grab the surface during the later propulsive phase, and to break over and make a faster transition during toe-off, thus enhancing stride frequency and exhibited speed. The ability of the horse's hoof to slide somewhat can also enhance stability relative to a situation in which a horse's foot would suddenly catch or grab the ground support surface, as can happen with the use of horseshoes having rectangular configurations which possibly further include toe grabs, raised traction members or cleats. Of course, the presence of extremely loose or slippery ground can neutralize the possible adverse effects of such traction devices, and in fact, such may provide better performance and safety in such circumstances.

As mentioned, it is known that in the unshod natural state, a horse's foot and hoof will flex and slightly widen when under load forces. It follows that use of relatively rigid metal or aluminum horseshoes substantially prevents this natural movement and so tends to reduce both the effective size, and the shock and vibration absorbing capability of a horse's foot. A steel horseshoe is known to be more forgiving in this regard than an aluminum horseshoe. For that matter, it is believed that the occurrence of hoof cracks is sometimes caused by the flexing and widening action of the foot and hoof working against the nails associated with a substantially inflexible horseshoe. Inflexible horseshoes also are known to prevent the natural wearing of the hoof, which can result in contraction and inflammation of the foot.

Non-metallic materials such as plastic or rubber are sometimes used in combination with a metal horseshoe and such hybrid products are generally referred to in the industry as bonded horseshoes.

Plastic and rubber materials have been chemically and/or mechanically bonded to metal shoes to create various configurations, e.g., these materials have been used between upper and lower metal layers of a horseshoe, between the horseshoe and the hoof, on the ground engaging portion of a horseshoe, and to completely encapsulate a metal horseshoe.

Although some shock or vibration may be relieved through these alternatives, the rigidity of the metal shoe is still present as is the damaging effect of the nails.

Horseshoes made entirely of plastic material are known. Most, if not all, plastics-fabricated horseshoes currently on the market, however, suffer from the disadvantage that they are time-consuming and awkward to apply, particularly those that have to be assembled from a kit of parts or require special equipment. The composition of plastic horseshoes varies widely with some being as restrictive as a metal horseshoe. And while some inventions teach methods where a person without farrier skills can attach the hoof covering, equine hooves require particular preparation prior to shoe application such that unknowledgeable trimming or rasping and handling of some equipment can realize disastrous results. For that matter, such unskilled farrier practice on most Thoroughbred horses, especially those in intensive training programs, can easily result in injury.

Furthermore, some glue-on horseshoes currently on the market require attaching the glue-on horseshoe using side extensions such as tabs or fabric cuffs which extend up the sidewall of the hoof. Gluing to a sidewall presents special problems, principally because bonds there can be subjected to very high tensile forces when a horse pivots, and bonds are usually weakest in tension. In addition, for horses with thin hoof walls, such as many Thoroughbreds have, when gluing side extensions the high heat (hoof adhesives heat up significantly when curing) can produce discomfort for the horse. The hoof wall is almost encapsulated by these extensions and adhesive, creating unnatural conditions which can be detrimental to the health of the horse's foot.

For that matter, it is time consuming to fit such a shoe, wasteful of material, and requires a number of parts to be supplied for each shoe. For the next shoeing, the tabs can prove extremely difficult to remove from the upper hoof wall, causing discomfort for the horse and extra time spent prepping the hoof for the fitting of new shoes.

Prior art has not recognized a product made from a plastics material which is widely accepted by trainers of performance horses. The foregoing illustrates limitations known to exist in present horseshoes. Thus, it is apparent that it would be advantageous to provide an alternative directed to overcoming the limitations set forth above.

The present invention offers a solution where prior art has failed. Two of the foremost problems are addressed by the invention, the eradication of a rigid shoe and nails as the form of attachment. For example, the invention provides horseshoes which conform to the foot imitating the known configuration which healthy, active, unshod horses acquire when living in a natural environment. The horseshoes are configured with a degree of hardness closely resembling the natural composition of the equine hoof that permits natural flexing and widening of the foot and horseshoe when under load forces.

The horseshoes offer many advantages including without imitation a significant reduction of trauma and stress subjected to the horse's skeletal and muscular system when under load forces and improved circulatory system thus enhanced performance and health of the horse.

Due to the characteristics of the present invention, a self leveling effect in the horseshoe is achieved. That is, in horses shod with the inventive horseshoes, as new horn is regenerated over the course of a few weeks, the horseshoe gradually wears, resulting in a longer period of optimal biomechanics before the next shoeing. The heels are allowed to drop naturally as they grow avoiding the jammed up effect which can often lead to quarter cracks.

The invention also provides an improved method of attaching a horseshoe using adhesives, which eliminates nails, promotes stronger, healthier horn regeneration and removes the element of error when driving nails. The horseshoe can be easily and efficiently attached or removed by a farrier in the field, as it may be cut, rasped, sanded or ground down using regular farrier tools. For that matter, the horseshoes considerably reduce occurrence of diseases and detrimental conditions of the foot, e.g. laminitis, navicular syndrome, white line disease and quarter cracks.

The inventive horseshoes are easily fitted to a foot having a given shape and width by cold forming without the need for special equipment. The horseshoes are neither bulky nor obtrusive, are light and comfortable for the horse and being attached by adhesive guards against dislodgment regardless of the direction of frictional force on the shoe relative to the hoof. For that matter, field testing has proven its strength and resilience by 6 weeks of continued attachment on a Thoroughbred racehorse in an intensive training program, producing winners on racing surfaces, dirt, synthetic and turf.

The invention includes one or more embodiments of therapeutic horseshoes configured for use in treating angular deformities and/or for compensating for various deleterious effects to the foot and hoof that can sometimes occur during known treatments for serious angular deformities.

Various limb deformities in foals, weanlings and yearlings, including angular deformities, can be treated at an early stage surgically and/or with foot care to correct the deformity or at least improve the prognosis as the horse matures. Angular limb and flexure deformities are common limb abnormalities manifest in foals that require early recognition and treatment. Foals with angular limb deformities, i.e., valgus and varus deformities, have traditionally been referred to as "knock-kneed" or "bow-legged" in the front limbs. A valgus deformity is defined as a deviation of the limb away from the midline (knock-kneed). A varus deformity is a deviation of the limb toward the midline (bow-legged). The most common location of angular limb deformity is the carpal joint (knee).

As is known, a growing horse's foot changes shape in response to weight distribution and varying a weight distribution. A side of the hoof that is lined up closer to the vertical line of force (bone column) develops a straighter vertical wall and the opposite site develops a more sloping wall and in more severe cases, develops a flare. As the vertical wall becomes more vertical it fails to provide adequate support. In some cases, the wall collapses or contracts beyond vertical and in extreme cases is known to fold over axially. These effects can propagate a cycle of distortion and imbalance having the related effect of worsening the angular deformity which caused the original problem.

For example, in a case of carpal valgus, the medial wall of the affected limb is lined up closer to the vertical line of force (plum line dropped from point of shoulder). As such, the medial wall receives more load and becomes straighter while the lateral wall (which is under loaded vertically) becomes flared or more sloping. Additionally, the region of the foot under the most load grows the slowest. Hence, the lateral wall in this case (less vertical load) grows faster and the medial wall slower, with time. Between trimmings the limb consequently becomes more valgus as the hoof capsule distortion pulls the limb out.

Foot management techniques are aimed at building and maintaining a healthy foot (base of support), where more severe cases require trimming and the addition of an extension. An extension can be an epoxy or acrylic patch with Kevlar fabric that is placed in the heel quarter and extended to a plum line dropped from the condyle of MC/MT III to the ground. Extensions are made out of acrylic, that is, built up around the side of the hoof wall and molded outwards to create an extension. Such extensions, however, create a lever affect on the hoof wall and can create flares and hoof wall separation, as described above.

Treatments using extensions, and the limitations of same, are described in detail within a publication by Scott Morrison, DVM; Morrison, S., FOAL FOOT CARE, CanWest Veterinary Conference, Oct. 17-20, 2009. Dr. Morrison's disclosure indicates that extension shoes, as an alternative to an acrylic/Kevlar extension, do not pull on a focal area as much as an extension and better distribute the leverage over a larger area. Dr. Morrison explains that while various shoe types can be used to create an extension shoe, aluminum is most common where the extension is directly glued to the bottom of the hoof.

Dr. Morrison explains, however, that while such aluminum shoes are helpful with wide feet, directly gluing such a shoe on a foal foot constricts the hoof to some degree and likely creates a mild heel contracture. Dr. Morrison posits that an indirect gluing method is probably the most effective and least damaging means for gluing an extension shoe, which allows heel expansion and constricts the hoof minimally, if at all. Dr. Morrison then discusses the Sigafoos' series gluing system, wherein flexible fiberglass fabric is adhered to the shoe and the wall to provide a flexible attachment to the shoe.

Such techniques may be said to frequently realize an entirely contracted hoof (i.e., mule footed), which provides poor limb support. At other times, only a half-contracted hoof, usually medially on a valgus deformity and laterally on a varus deformity. Dr. Morrison indicates that there is benefit from widening the foot to a normal shape or widening the contracted half to so that it is pulled out beyond vertical, which is known to be accomplished by use of hinged spring shoes.

A medial extension on one side and toward the back of the foot will support the overloaded side of the limb, i.e., will move the plane of support toward the midline to allow a more even distribution of weight over the support surface. This has the effect of promoting centerline breakover. Extensions constructed from poly methylmethacrylate (Equilox®) and fiberglass are applied directly to the foot by the veterinarian, and shaped to the desired width to provide the exact amount of correction. The extension is trimmed by the veterinarian like normal hoof as the foot grows or additional applications are applied as deemed necessary.

There are significant problems in the use of solid inflexible extension horseshoes, for example, aluminum. The hoof is unable to flex naturally, and change with the redistribution of weight. That is, by fixing the hoof directly to an inflexible surface (as discussed above), the ability of the actively developing young hoof can be inhibited. The inability of a developing hoof to flex limits blood circulation and supply therein, which is so important to the developing hoof of foals, weanlings and yearlings, particularly when the treatment end is to stimulate the limb growth plates without sacrificing the hoof development. Furthermore, as the developing hoof grows, the rigid extension horseshoes must be changed on a regular basis to allow for these changes. Anytime these therapeutic applications are applied and removed on a regular basis there is hoof wall removed, in some cases more than is being generated (horn growth), particularly with indirect glue cuff shoes (such as taught by Sigafoos, as discussed above) that encapsulate the foot, hoof wall is degraded through the duration of wear and at re-application where hoof wall is removed to prep the surface for a new horseshoe. The therapeutic extension horseshoe as it adapts to the changing young hoof can be left on for longer periods of time.

For that matter, while the problem of wear tends to be insignificant in hard metal extension shoes, extensions made from acrylics, etc., may wear unevenly. And while uneven wear may not significantly affect the foot, per se, it may have a limiting effect on the intended improvement. That is, wear can limit the therapeutic effectiveness of a therapeutic extension shoe

SUMMARY OF THE INVENTION

The horseshoes provided in accordance with the present invention overcome the shortcomings of known prior art horseshoes, and known methods for treating angular deformities.

The therapeutic extension horseshoe of this invention overcomes the shortcomings of known extensions, and known extension horseshoes, aiding to correct for angular deformities in foals, weanlings and yearlings. The therapeutic extension horseshoe is formed to operate to provide either lateral or a medial extension, depending on the orientation at shoeing. That is, the therapeutic extension horseshoe itself is flipped so that either side may be applied to the foot, depending on whether a varus or valgus deformity is instantly being treated. Both ungulate and hoof-contact surfaces double as sole or ground contact surfaces, again, depending on where the extension is needed, on the outside (lateral) of the foot or inside (medial).

The present inventive therapeutic extension horseshoe, when affixed, facilitates the natural spreading and circulation pumping action of the equine hoof when in motion, and interferes as little as possible with the natural mechanical functioning of the horse's foot. The inventive horseshoe, but for the therapeutic embodiment, should not exert on the muscles and tendons thereof any strain, pressure or other unnatural force to which the horse is unaccustomed. Angular deformities in foals create unnatural forces and strain to the afflicted limb(s) which can be extreme depending on the severity of the abnormality, the therapeutic extension horseshoe supports the limb, and thus load, by providing a platform where the hoof should be. This curtails the progressive deviation of the limb and distortion to the hoof capsule which in turn aids in the correction.

In all of the embodiments, the inventive horseshoes satisfy the aforesaid needs with a horseshoe configured to allow the equine hoof mechanism to function without limitation when under load forces, thus flexing and widening, the equine foot is encouraged to be as nature intended permitting the hoof to grow and wear without restriction. While the therapeutic extension horseshoe does modify the load bearing surface, to effect a stature modification as intended, the inherent structure and functioning remain the same.

Intended to benefit most are horses under highly stressed conditions of competition on the racetrack, exhibition arena or polo field. But the scope of the present invention could be a great deal wider where horses require an alternative to the rigidity of metallic shoes, e.g., horses performing on stage in the entertainment world, stallions when covering a mare in the breeding shed, or young horses that require custom made configurations to manage angular deformities, etc.

The therapeutic extension horseshoe of the invention was developed to aid with angular deformities in foals through weanlings (6-12 months old) to yearlings (12-20 months old). Adjusting angular deformities is possible only because a young horse's skeletal system is still growing and developing until the young horse is between 12-20 months. Once the growth plates at the joints have closed (bone stops developing), correction is not possible. For that matter, the growth plate at the fetlock closes at 12-16 weeks of age and that at the knee closes at between 16 to 20 months.

Angular abnormalities are usually present at birth and are a result of an imbalance in the growth plate(s). For example, one side may develop faster than the other resulting in a typical toed-in or toed-out stance. Correct limb alignment can be manipulated by applying the therapeutic extension horseshoe to the hoof with the extension below the overdeveloped growth plate.

One of the significant advantages of the therapeutic extension horseshoe is that its flexible resilient nature does not restrict but actually facilitates growth of the young horse's hoof. As mentioned, a foal's foot changes rapidly over the first few weeks/months and can easily be compromised by restricting this change/growth with conventional horseshoe extensions (aluminum), full cuffs, etc. For that matter, in conventional treatments for angular limb deformities the foot may be sacrificed to correct the limb deformity. These problems are more prevalent if known types (e.g., aluminum) of horseshoe extensions are not changed on a regular basis.

Another advantage of the therapeutic extension horseshoe is that it provides support for the limb where the foot should be. The resulting added pressure to the growth plate slows its development and allows the opposing side to "catch up". For example, with the toed-out stance the extension horseshoe is applied with the extension/platform to the medial or inside of the hoof, the added pressure/load slows the growth of the medial side of the growth plate above, the lateral side of the growth plate continues to develop normally and as a result the limb is encouraged to straighten.

In a toed-in stance, the extension horseshoe is applied with the extension/platform to the lateral or outside of the hoof, the added pressure/load slows the growth of the lateral side of the growth plate above, the medial or inner side of the growth plate continues to develop normally and as a result the limb is encouraged to straighten. As mentioned, it is a matter of flipping the therapeutic horseshoe for either application.

Another advantage of the therapeutic extension horseshoe is that it adapts to the young horse's changing foot so it may be left on for longer periods of time. This of course realizes a cost saving with respect to DVM and/or farrier services. Perhaps more importantly, anytime these therapeutic applications are applied and removed on a regular basis there is some portion of hoof wall removed. And under some circumstances, more hoof wall may be removed than is being generated (horn growth). The therapeutic extension horseshoe provides support across the entire hoof minimizing the distortion to the hoof capsule, for example, possible flare and wall separation.

DETAILED DESCRIPTION OF THE INVENTION

The present invention teaches a novel design for a preferred horseshoe that closely resembles the natural composition of the equine hoof which conforms to the foot, imitating the known configuration which healthy, active, unshod horses acquire when living in a natural environment, and a novel therapeutic extension horseshoe designed to aid angular deformities in foals through yearlings.

Figures 1, 2, 3, 4, 5, 6, 7, 8, 9:
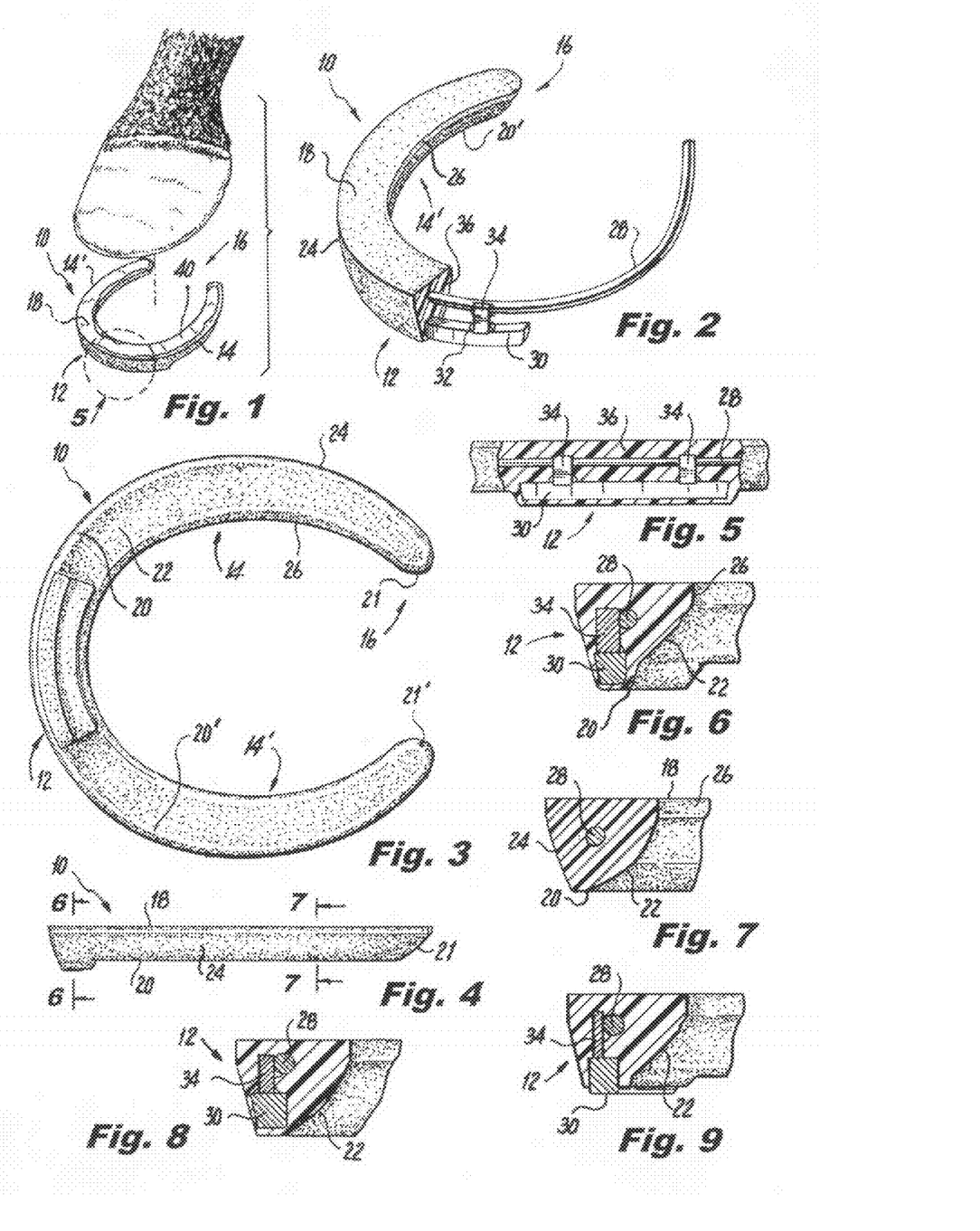
FIG. 1 is an exploded perspective view of the preferred embodiment of the horseshoe to be adhesively attached to a horse's hoof.
FIG. 2 is a top perspective view of the horseshoe of FIG. 1 with the polymeric material removed from one side to expose half the hard wear resistant insert and wire.
FIG. 3 is an underside plan view of the horseshoe.
FIG. 4 is a side elevation of the horseshoe.
FIG. 5 is a front elevation of the horseshoe taken at arrow 5 of FIG. 1, showing the polymeric material removed to expose the hard wear resistant insert.
FIG. 6 is a sectional side elevation taken at 6-6 of FIG. 4, showing the hard wear resistant insert with prong extensions and wire exposed.
FIG. 7 is a sectional end view elevation taken at 7-7 of FIG. 4, showing the surface contour and exposed wire of the horseshoe.
FIG. 8 is a sectional elevation of an alternate toe portion embodiment, with hard wear resistant insert completely encased within the polymeric material.
FIG. 9 is still another alternate toe portion embodiment in which the hard wear resistant insert protrudes from the polymeric material.

FIG. 1 shows a shoe, or horseshoe 10 in accordance with one embodiment of the present invention, in spaced relation to the underside of a horse's hoof. The horseshoe 10 is molded in a traditional C-shape with an open heel. For orientation purposes, the shoe provides a toe portion 12, or anterior segment, left side portion 14, right side portion 14' and heel portions 16, or caudal segments. In practice, it is preferred that portion 14 and 14' be molded or formed as mirror images in terms of shape and surface contour. On an animal to be shod, the toe portion 12 is the segment of the shoe toward the anterior, or front, and the heel portions 16 are the segments of the shoe toward the caudal, or rear, of the animal. Although described here as segments, these are integrally formed as one piece, and the terms are used to describe their general location in relation to the hoof of a horse.

Referring again to FIG. 1, horseshoe 10 has a top 18, or hoof contact surface, which receives a coating of adhesive 40 prior to placement on the sole of the hoof. In practice, it is desirable that hoof contact surface 18 be roughened or otherwise textured, so as to insure a good bond with the adhesive 40 and the sole of the hoof. A typical hoof contact surface 18 is level, and tapers at the end of the heel portions 16.

Turning now to FIG. 3, the underside of shoe 10 is illustrated. A base 20 and 20', or ungulate surface, which is the terrain-contacting surface, is formed about the arcuate periphery of side portions 14 and 14' through the toe portion 12 ending at the heel portions 16. As seen in FIG. 3 and FIG. 4, the base 20 and 20' terminates in smoothly tapered faces 21 and 21', at heel portions 16. In practice, the base 20 and 20' is formed level so as to insure good contact with any typically encountered terrain. As seen in FIGS. 3 and 4, shoe 10 is formed with an inwardly tapering, arcuately formed outer edge 24, and inner edge 26. As best seen in FIG. 7, which is a sectional elevation taken through left side portion 14, a bevelled 22, or chamfered surface, forms a transition between the outer edge 24 of the base 20 and inner edge 26. This bevelled 22 form can be optionally formed as a flat surface, or with a slight "belly" as seen in FIG. 7.

During the lifespan of the shoe 10, the width of the base 20 will increase as a result of frictional terrain contact, as bevelled surface 22 is ground down (shown in FIG. 13 and discussed later). This "wearing" of the shoe is desirable, as the material forming the shoe absorbs the impact and does not transfer the stress to the horse's musculature.

Turning now to FIG. 2 a portion of the internal structure of the horseshoe 10 according to one preferred embodiment of the present invention is revealed. In a typical embodiment, the shoe is molded of a polymeric material 36, and preferably hybrid polyurethane. A pliant wire 28, or reinforcer which may be made from metal such as, steel, aluminum alloys, stainless steel and the like, which can be formed and retain a C shape, or arc, is embedded within the horseshoe 10, or it can be totally encapsulated. The wire 28 is preferably formed of a single rod of material, which is then encased within the polymeric material 36 of the shoe, as seen in FIG. 2. The encapsulated wire 28 preferably has a thickness of approximately ⅛", but the size is predetermined by one skilled in the art of a farrier. To reinforce the toe portion 12 of the shoe, which contacts the ground surface, the invention includes a hard wear resistant insert 30, or hardened reinforcer, preferably made from metal such as steel or another hardened material.

When a metal is used for the reinforcers, one preferred embodiment is a magnetizable metal, which is considered therapeutic by those skilled in equine science.

As shown in FIG. 5, the toe portion 12, the hard wear resistant insert 30 when made of steel is attached to the wire 28 by at least two prong extensions 34. Typically, spot welding, as at 32, is employed to join the hard wear resistant insert 30, prong extensions 34 and wire 28, although other fabrication processes could be contemplated. The hard wear resistant insert 30 preferably is approximately 2½" in length, ¼" in width, with prong extensions 34 of approximately ¼" and the insert preferably is almost completely encapsulated within the moldable polymeric material 36, as seen in FIGS. 5 and 6. It should be noted that polymeric material 36 forms a thin wall around hard wear resistant insert 30; this wall wears away quickly subsequent to installation on the hoof, exposing the hard wear resistant insert 30.

In other embodiments, the hard wear insert is fitted to the anterior segment of the shoe by means other than welding, such as being co-molded with the entire shoe, bonded chemically or by polymeric bonds, joined with mechanical fasteners.

Two alternate embodiments are shown for toe portion 12 in FIGS. 8 and 9. FIG. 8 discloses a profile in which hard wear resistant insert 30 does not depend from the underside of the shoe. FIG. 9 illustrates a hard wear resistant insert 30 which depends from the shoe and is not completely encased within the polymeric material 36.

The moldable shoe generally is molded integrally, in one piece, and is an open ellipse shape. That ellipse is closed from the caudal end portions, through the side segments and the anterior segment, and is open between the two caudal ends. The shoe is flexile, because of the moldable composition and the pliant metal reinforcer, such that the shoe can be conformed to the shape of a horse's hoof. The pliant metal embedded or encapsulated in the shoe enables the farrier to bend it to conform to the circumferential edge of the hoof. That pliant metal reinforcer preferably is joined to the second reinforcer, or hard wear insert, which is fitted to the anterior segment or toe portion of the shoe. The shoe has a contact surface that is joined to the hoof by adhesives, selected by skilled farriers. The opposite side of the shoe is the ungulate surface, which has the inventive quality of performing like an unshod hoof. The ungulate surface preferably has a sidewall, a crowned edge and an inner wall. The sidewall starts along the outer arc of the ellipse-shaped segments. The sidewall of many conventional metal horseshoes is vertical from the hoof to the ground. The preferable sidewall of the present invention is not vertical, but is chamfered or bevelled in toward the inner arc of the ellipse-shaped segments. The chamfered sidewall, crowned edge and tapering inner wall of one preferred embodiment perform, wear and flex in a way comparable to an unshod hoof.

The preferred horseshoe 10 is molded from polymeric material 36 to form a moldable shoe that is flexile. Polymeric material 36 is available in a vast range of durometer hardness, and flexural qualities. The present invention's durometer on the Shore D scale preferably ranges from 60 to 70 from the Hapflex 600 series device, produced by Hapco Inc. Hanover, Mass.

Physical Properties:

|  |  | 661 | 666 | 671 |
|---|---|---|---|---|
| Hardness Shore |  | 60D | 65D | 70D |
| Tensile Strength (psi) |  | 2400 | 3300 | 4200 |
| Tear Strength (pli) |  | 420 | 450 | 660 |
| Modulus of Elasticity (psi) 000 |  | 20 | 25 | 60 |
| Heat Distortion |  |  |  |  |
| Temp. (° C.) | 66 psi | 122° C. | 110° C. | 133° C. |
|  | 264 psi | 62° C. | 71° C. | 124° C. |
| Flexural Strength (psi) |  | 1660 | 2700 | 3710 |
| Flexural Modulus (psi) 000 |  | 24.6 | 41 | 57 |

Figures 10, 11, 12, 13:
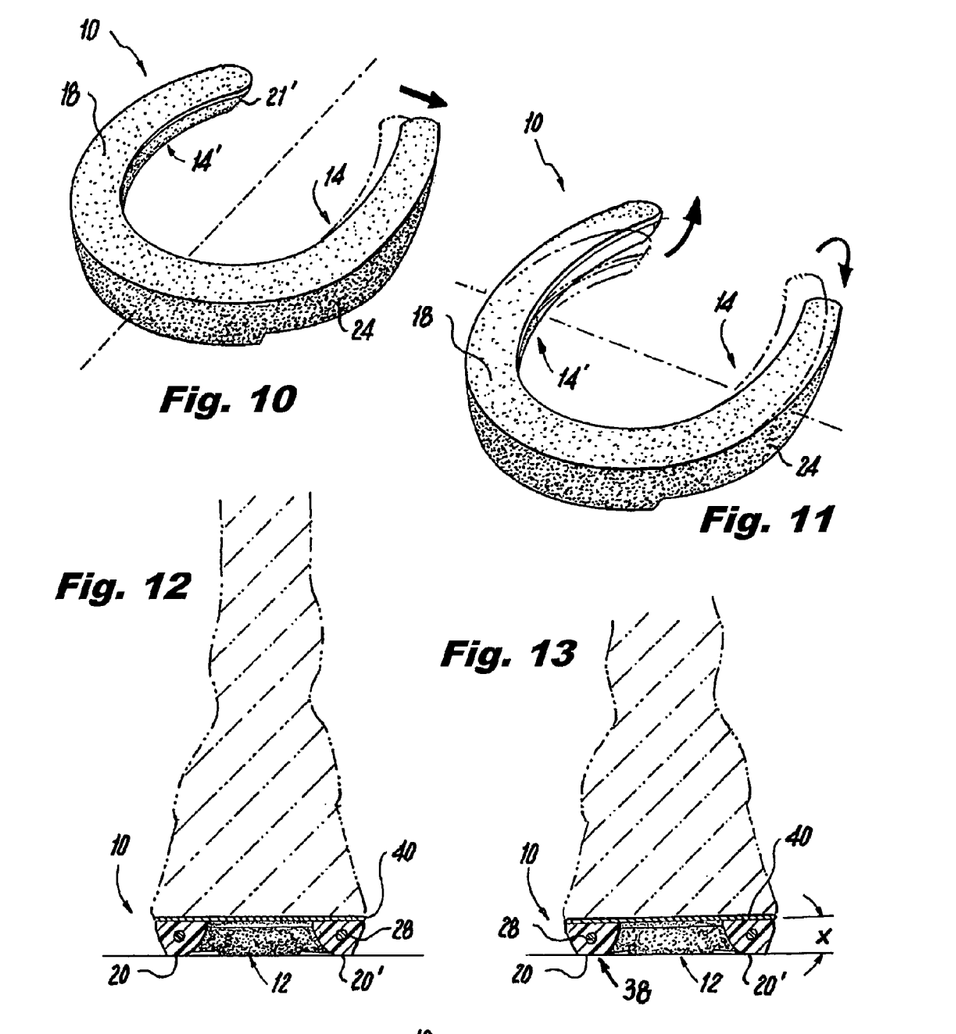
FIG. 10 is a perspective view of the horseshoe showing width-wise bending of the side and heel portion.
FIG. 11 is similar to FIG. 10, however illustrates the racking ability of the side and heel portions of the horseshoe.
FIG. 12 is a diagrammatic sectional elevation of the preferred embodiment of the horseshoe adhered to a horse's hoof.
FIG. 13 is a diagrammatic sectional elevation of the preferred embodiment, showing uneven wear of the polymeric material as a result of a horse's uneven gait or angular deformities.

As seen in FIGS. 10 and 11, the durometer of polymeric material 36 forming the preferred embodiment allows for flexing and bending of side portions 14 and 14'. This bending or "racking" of the shoe is advantageous for custom fitting of the shoe during installation on a hoof. In particular, racking is illustrated in FIG. 11, where the side portions are stressed in opposing directions about the longitudinal centerline. This flexibility and durability may be required while traversing a rugged trail, in which the horse's hoof is subjected to awkward hoof strikes on rocks, crevices and debris. The ability to flex increases the shoe's durability, as well as mitigating the stress applied to the horse's hoof, ankle and leg.

FIGS. 12 and 13 are diagrammatic sectional elevations of shoe 10, as viewed from the heel portions 16. FIG. 12 shows a new shoe 10 installed with an adhesive 40 layer to a horse's hoof. It is appreciated that the base 20 and 20' is intact, as is toe portion 12. FIG. 13 illustrates shoe 10 as worn by a horse suffering from an uneven gait or angular deformities. It will be appreciated that the base 20 has been worn down as at 38, the result of compensating for the horse's uneven load forces upon the hoof. The shoed portion of the hoof which takes the greatest measure of ground contact will wear down comparably to that of an unshod hoof. In addition to the uneven load forces the equine hoof wall may have varying growth rates, the shoe 10 adapts to this uneven growth by wearing therefore the hoof is permitted to strike naturally, as indicated at an angle denoted by "x". The flexile material does not bind the hoof as does a metal shoe. Unlike prior art, which typically causes discomfort during an uneven hoof strike, shoe 10 allows for the uneven hoof strike and provides both comfort and shock absorption.

Figure 14:
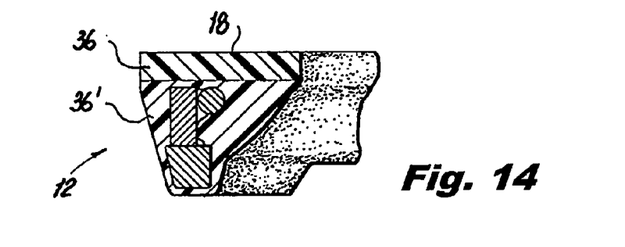
FIG. 14 is a sectional elevation of an alternate toe portion embodiment, illustrating dual layers of polymeric material with differing durometers.

The horseshoe 10 according to the present invention is molded from polymeric material 36 with a uniform durometer of hardness. Alternatively, as depicted in FIG. 14 alternate layering of polymeric material 36 with different durometer of hardness in the molding step could be beneficial for some animals or for varied ground conditions. As illustrated in FIG. 14, toe portion 12 is formed with a polymeric material 36 of a durometer for comfort adjacent the hoof, while material 36' is selected for durability and wear-resistance due to its harder durometer. Persons skilled in the art will rely on their experience to select a moldable composition that provides useful levels of flexibility, wear and resiliency, and to select a reinforcer wire that is sufficiently pliant that adequately holds the desired shape, and to select a hard wear insert material for the horse and the ground conditions. All of these are within the level of skill of an experienced farrier.

Process of Manufacture

The wire 28 is shaped and cut from bar stock to the C shape of the preferred horseshoe 10 which varies in sizes. The wire 28 length is adjusted to fit inside the mold allowing for approximately ½" where the side portions 14 and 14' preferably taper to faces 21 and 21' at the heel portions 16. The toe portion 12 of the wire 28 is attached by spot welds 32 to the prong extensions 34 of the hard wear resistant insert 30. Fabricating the wire 28 and hard wear resistant insert 30 in one piece is an alternative. Another embodiment is spot weld 32 to prong extensions 34 where the hard wear resistant insert 30 would be flush with the base 20 of the horseshoe 10, as shown in FIG. 8, or to spot weld 32 to prong extensions 34 resulting in the hard wear resistant insert 30 projecting out from the polymeric material 36, as shown in FIG. 9.

A mold of the preferred horseshoe 10 is sprayed with a suitable release agent, such as, Grease-It Four, Hapco Inc. The wire 28 with attached hard wear resistant insert 30 is set inside the mold with the ends of the wire 28 suspended by fine line made of plastic, nylon or like material across the heel portions 16, or by using magnets to hold the wire 28 in place or by other means to maintain the wire's 28 position in the core of the mold. An alternate embodiment, when using a magnet to maintain the wire's 28 position in the core of the mold, is to place and secure the magnet on top of the wire 28 allowing the polymeric material 36 to encapsulate it to become part of the horseshoe 10. This alternate embodiment would magnetize the horseshoe 10 providing magnetic therapy to the hoof wall when fitted.

The polymeric material 36 is mixed to a moldable form, in accordance with the chosen product's ratio formula, preferably to a low viscosity, making it easy to handle and pour. Gel time is approximately 30 minutes with a demold time of 2-4 hours, which is the time to reach 80% of cure. Size, mass and temperature effects gel and demold time. For a full cure, some may prefer to allow 7-10 days. Demold and final cure time can be accelerated with the addition of heat.

The mold defines the segments of the shoe, and the shape of the preferred ungulate surface, as described above. When the mold is filled, the composition reaches a level naturally, which forms the generally planar, hoof contact surface.

Once full cure is reached the preferred horseshoe 10 is prepared for attachment. To achieve a surface that bonds well with adhesive 40 the top 18, or hoof contact surface of the preferred horseshoe 10 is sanded to attain a rough appearance and feel as opposed to a smooth, glossy finish realized straight from the mold.

The process for manufacturing the therapeutic extension horseshoe (discussed in detail below in cooperation with FIGS. 15-25) is slightly modified. For example, instead of maintaining the reinforcer (i.e., first reinforcer or wire) close to the contact surface, the reinforcer is maintained in substantially the center with respect to the vertical depth, or halfway between the surfaces. In an embodiment including that the wear inserts (vertical studs) stand alone in the moldable polyurethane material comprising the lateral or medial extension, such that they are not connected to the wire-like, U-shaped reinforcer, they may be inserted into the mold material and set in place as cured.

Alternatively, the wear inserts/studs may be inserted into vias first drilled in the cured material comprising the lateral or medial extension portion. Where the wear inserts/studs are connected to the reinforcer, which is located within, or proximate, the extension within the therapeutic extension shoe, they are first welded to the reinforcer prior to its insertion in the mold, or material in the mold before it is set.

Method of Attachment

The design of the preferred horseshoe 10 is such that it is attached to the hoof by adhesive 40. In the preferred embodiment, the shoe has no nail holes or attachment tabs, and is designed to be adhered to the hoof by adhesive between the contact surface of the shoe and the hoof. Through field testing much success has been achieved by using Equilox, Vettec or Grand Circuit Hoof Adhesive, which are among several products on the market for bonding horseshoes to the hoof. The properties of these adhesives allow the preferred horseshoe 10 to flex and widen without weakening the bond between the horseshoe and hoof.

After the hoof is prepared (trimmed and rasped) and the preferred horseshoe 10 custom fitted, a degreasing agent such as acetone is applied to the perimeter of the sole where the adhesive 40 shall be applied. It is important to have a clean, greaseless surface to achieve a good bond. Alternatively, the contact surface may be roughened so as to accept adhesive and form a bond. A protective foot covering can be used to keep the hoof clean whilst the adhesive 40 is prepared. Hoof adhesive 40 is applied to the top 18, or hoof contact surface of the preferred horseshoe 10. Alternatively, adhesive can be applied to the perimeter of the sole of the foot, with care being taken not to apply the product in excess. Any excess adhesive 40 can be removed and added to the heel area where required. In some cases where a horse's hoof is weakened from previous nail holes or past ailments this is an appropriate time to patch the area with hoof adhesive 40 during or after fitting the preferred horseshoe 10. The cure time of the hoof adhesive 40 gives a farrier time to set the preferred horseshoe 10 in place and adjust its position if necessary before setting. Cure times vary with environment conditions and products. They range between 2-4 minutes in warm temperatures up to 7 minutes in cold temperatures. Several products on the market have faster cure times than others.

Once the preferred horseshoe 10 is set in place and the hoof adhesive 40 has cured any excess adhesive 40 on the sole, outside of the hoof wall or around the heel area is removed by rasping or use of a sanding tool resulting in a streamline uninhibited foot. The hoof adhesive 40 once cured is comparable to the composition of the hoof wall.

When the horse is due to be shod again the preferred horseshoe 10 is simply trimmed off using farrier's nippers just as if it was hoof wall.

Operation of Invention

The simplicity of the present invention is one of the advantages over prior art. It is devised to be part of the horse's own hoof and function as one, expanding and contracting in the identical direction.

The hoof mechanism in its natural state is designed to be a shock absorber as well as a vital aid to the circulatory system. When a horse is in motion, on contact with the ground surface the weight of the horse compresses the digital cushion between the pastern bone and the sensitive frog and redirects the remainder of the force outwards and upwards to the lateral cartilages (attached to the sides of the coffin bone). The foot expands and widens when under load forces as does the polymeric material 36.

As the foot is lifted in stride the digital cushion expands and the foot contracts, as does the polymeric material 36, forcing the blood out of the foot and up the leg.

The polymeric material 36 is designed to wear 38 unlike the deliberations of prior art horseshoes. This characteristic is enhanced by the base 20 of the preferred horseshoe 10. As the base 20 is beveled 22 from the outside edge 24 of the preferred horseshoe 10 to the inside edge 26 it shall wear 38 more rapidly when subjected to additional force, this wear will slow as the beveled 22 edge becomes worn and thus wider. For example when a horse's foot hits the ground it may not set it down evenly due to bad confirmation or gait. (Many horses do not have perfect confirmation or way of going.) If more weight is distributed on one heel over a period of time the base 20 of the preferred horseshoe 10 shall wear 38 down more in this area having the effect of self leveling which in turn prevents the horse's heel becoming jammed up leading to pain and inflammation in the foot. This concave shape of the preferred horseshoe 10 imitates the known configuration which healthy, active, unshod horses acquire when living in a natural environment.

The wire 28 which is encapsulated within the preferred horseshoe 10 does not restrict its flexing and widening capabilities. The wire 28 has two novel and primary purposes. First, is to enable shaping of the horseshoe 10 by a farrier in the field for an individual horse, when the horseshoe 10 is custom formed by hand (pressure applied to widen or reduce the width) the wire 28 retains the shape without the need of special equipment making the procedure quick and efficient. The polymeric material 36 of the preferred horseshoe 10 can simply be cut, sanded or rasped if necessary. Second, is to give the hard wear resistant insert 30 a means of attachment and reinforcement within the polymeric material 36.

The hard wear resistant insert 30 which is attached to the wire 28 gives reinforcement to the toe portion 12 of the preferred horseshoe 10. As this area of the preferred horseshoe 10 is subjected to the most abrasion especially over unnatural surfaces, e.g., tarmac and concrete, the hard wear resistant insert 30 prevents the preferred horseshoe 10 in this area wearing too rapidly, thus extending the time between shoeing.

Therapeutic Extension Horseshoe

As described in detail above, angular deformities occur when the distal extremities of the limb deviate from the midline of the limb. Valgus deformity is a deviation lateral of the mid line. Varus deformity is a deviation medial of the mid line. Lateral and medial therapeutic extension horseshoes of this invention are primarily intended for use on foals or young stock with limb development problems, these shoes extend to the inside (medial) or the outside (lateral). By creating a ground-bearing surface in the position where the foot should be, the active growth plates can adapt to the foot's modified posture. The plates must be actively growing, as you cannot manipulate the deformity once the limb has stopped growing.

The benefit of flexing and moving with the foot is achieved with the therapeutic extension horseshoe, as explained in detail above. That is, the resilient moldable material (for example, urethane or hybrid polyurethane) and the reinforcer act in the same way as in the non-therapeutic horseshoes. As mature horses benefit from the inventive horseshoe described above, the properties are even more important in horseshoes worn by young growing horses when used in cooperation with natural growth cycles to correct for the aforementioned limb deformities.

As described above, using extensions made of acrylic material is known. A DVM or farrier applies and builds up material around the hoof wall to create a platform, instead of using an extension horseshoe. Such a method, however, can be detrimental to the integrity of the hoof wall resulting in a possible flare and wall separation. The therapeutic extension horseshoe provides support across the entire hoof, minimizing distortion to the hoof capsule.

In view of the fact that the therapeutic extension horseshoe is designed to treat young developing horses (foals, weanlings, yearlings), there is no need for a hardened wear insert to be present in the toe or anterior region as foals through yearlings typically are not subjected to the abrasive surfaces present at racetracks. While foals through yearlings are generally too young for this type of work/competition, they do benefit from the inclusion of studs or wear inserts arranged in the lateral or medial extensions.

That is, while foals/yearlings are not necessarily training on special surfaces likely to abnormally wear a horseshoe, the maximum benefit of a therapeutic extension horseshoe is realized where the extended portions of the polyurethane mold structure are not degraded by wear. That rounding or degradation from wear will detract from a maximal therapeutic effect. Hence, by including wear inserts or vertical studs in the extension, the full remedial potential may be realized.

For that matter, the studs may be arranged in the polyurethane mold structure to stand alone, or may be connected directly or indirectly to the reinforcer. The reinforcer may be traditionally U-shaped, or may deviate slightly so that a portion (from the toe to one caudal end) extends into the medial or lateral extension, as shown in the drawing figures. The wear inserts (vertical studs) may be incorporated into the lateral or medial extension portions during fabrication, i.e., molded, or may be inserted into openings or vias drilled or otherwise imposed in the molded material (e.g., polyurethane), forming the extension area after curing.

Figure 15:
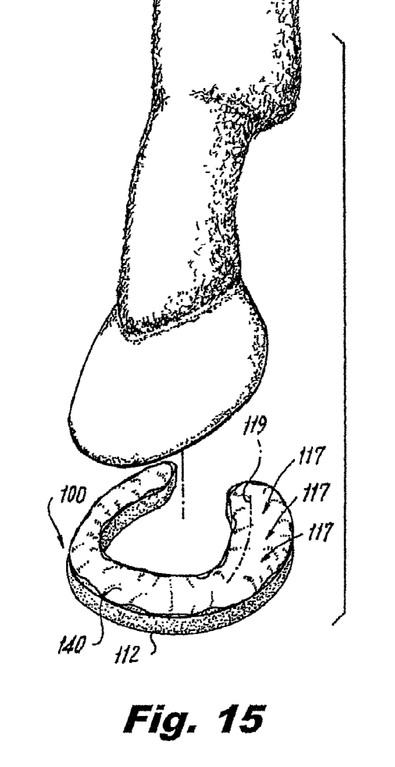
FIG. 15 is a perspective view of a therapeutic extension horseshoe of the invention, adjacent a hoof.
Figure 16:
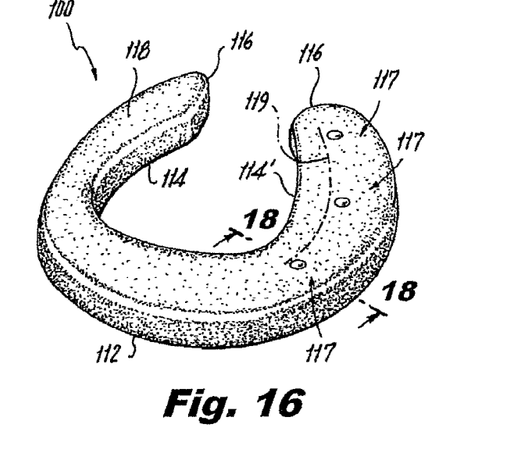
FIG. 16 is an enlarged perspective view of the therapeutic extension horseshoe of FIG. 15, including a reinforcing member with wear studs connected thereto.
Figure 17:
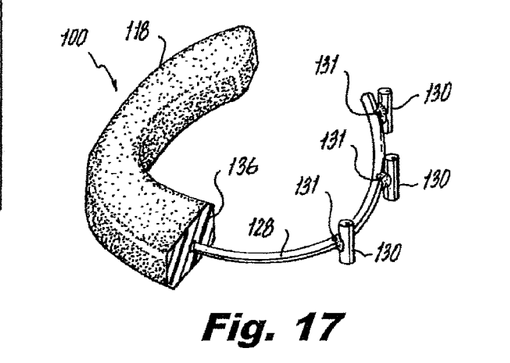
FIG. 17 is a view exposing the reinforcing member and wear studs.

FIG. 15 is a perspective view of a therapeutic extension horseshoe 100 of the invention, with a layer of adhesive 140, adjacent a hoof. FIG. 16 is an enlarged perspective view of the therapeutic extension horseshoe 100 of FIG. 15, where FIG. 17 is a view exposing a reinforcing member 128 and wear inserts or studs 130. The therapeutic extension horseshoe 100 is molded in a traditional U-shape with an open heel.

For orientation purposes, the shoe provides a toe portion 112, or anterior segment 112, left side portion 114, right side portion 114' and heel portions 116, or caudal end segments. Although described here as caudal segments, these are integrally formed with the right and left side portions 114, 114' and anterior segment 112 as one piece, and the terms are used to describe their general location in relation to the hoof of a horse. The therapeutic extension horseshoe 100 has a top 118, or hoof contact surface, which receives a coating of adhesive prior to placement on the sole of the hoof. A typical hoof contact surface 118 is level, and tapers at the end of the heel portions (i.e., caudal end segments) 116.

Therapeutic extension horseshoe 100 is molded of a polymeric material 136, and preferably hybrid polyurethane. A pliant wire 128 or reinforcer is embedded in the hybrid polyurethane according to the method of manufacture. The reinforcer 128 may be made from metal such as, steel, aluminum alloys, stainless steel and the like, which can be formed and retain the U shape when flexed with normal hoof contractions and expansions (between the open heel caudal end segments). The reinforcer 128 is preferably formed of a single rod of material, which is then encased within the polymeric material 136 of the shoe. The encapsulated wire or reinforcer 128 preferably has a thickness of approximately ⅛", but the size is predetermined by one skilled in the art of a farrier.

Figure 24:
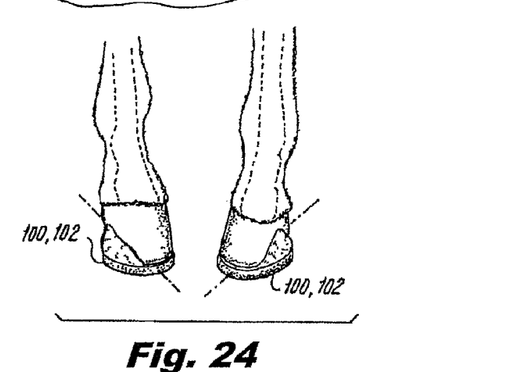
FIG. 24 is a perspective view of a pair of legs with a toe in problem, highlighting the installed therapeutic extension horseshoes and bone structure in phantom.
Figure 25:
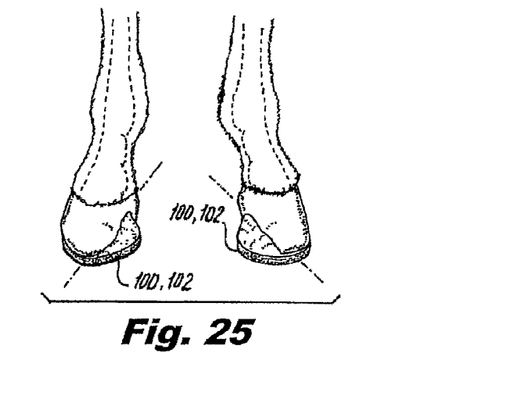
FIG. 25 is a perspective view of a pair of legs with a toe out problem, highlighting the installed therapeutic extension horseshoes and bone structure in phantom.

As can be seen clearly in FIGS. 15 and 16, therapeutic extension horseshoe 100 includes an extension portion 117, to the right of a virtual line 119 in the plane of the figures. This is the portion to the right of virtual line 119 comprising hybrid polyurethane shaped as to enlarge the size of the platform for one side of the horse's hoof. Please note that assuming the FIG. 15 hoof to be a left front hoof of a yearling facing out of the page, the extension portion 117 (in the orientation shown) may be said to operate as a "lateral" extension (as shown in FIG. 24). The lateral extension extends out from right side portion 114'. Please note, however, that it is an advantage of the invention that the therapeutic extension horseshoe, if affixed to a right hoof (as shown in FIG. 25) may be said to operate as a "medial" extension. Put another way, merely flipping the shoe will change its operation as a medial or lateral therapeutic extension horseshoe.

Figure 18:
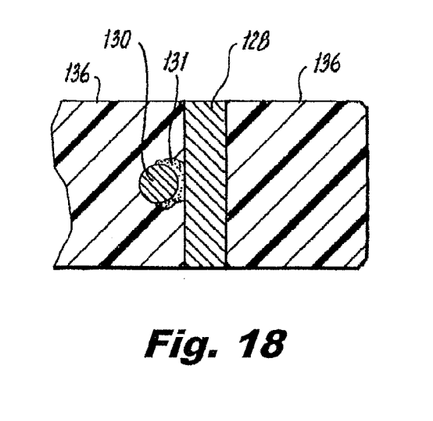
FIG. 18 is a sectional elevational view taken at 18-18 of FIG. 16, highlighting the reinforcing member with wear studs encapsulated in urethane.

To reinforce the extension in right side portion 114', which contacts the ground surface, the therapeutic extension horseshoe 100 includes one or more wear resistant inserts or studs 130. Three wear inserts or studs 130 are shown in FIG. 17 connected directly to reinforcer 128, preferably welded. FIG. 18 is a sectional elevational view taken at 18-18 of FIG. 16, highlighting the reinforcer 128, as welded by weld 131 to wear insert 130, encapsulated in urethane 136. For that matter, wear inserts or studs 130 are preferably hard wear inserts, and are not pliable.

Please note that while three wear inserts or vertical studs are shown in the drawing figures, any number may be used depending on the intended application. For example, in the foal stage, the weight of the foal is less that that of the yearling and depending on the severity of deformity, the foal's exercise will be controlled (stimulation to growth plates). Hence, therapeutic extension horseshoes constructed for use by foals may not require a stud (vertical insert) for wear resistance or if at all, only one in the area of load bearing extension.

Weanlings are heavier than foals, so hooves and horseshoes shod thereon are subjected to greater load. In this case, more than one stud (vertical insert) may be required to maintain proper form depending on the time that the therapeutic extension horseshoe is attached. Yearlings are heavier than weanlings (and foals). And as mentioned, the more severe the limb deformity the greater the load bearing on the extension and possible wear. Hence, at least two studs (vertical inserts) are required for therapeutic extension horseshoes utilized to treat yearlings. If one or more studs were not present in the extension, the polyurethane would more readily wear under the additional load having an adverse effect on the limb, at least because the area of wear would likely be lower in profile than the other side of the shoe.

Figure 19:
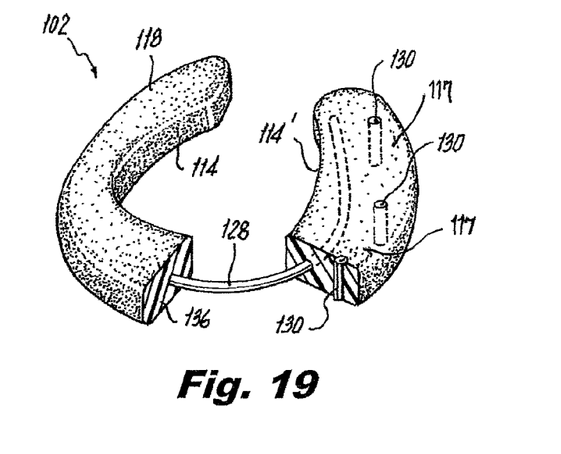
FIG. 19 is a perspective partial cutaway view of an alternative embodiment of the therapeutic extension horseshoe of FIG. 15, wherein wear studs are arranged but are not affixed to the inner reinforcing member.

FIG. 19 is a perspective view of an alternative embodiment of the therapeutic extension horseshoe embodiment depicted in FIGS. 15-18. Therapeutic extension horseshoe 102 of FIG. 19 includes that wear inserts or vertical studs 130 are arranged to stand alone in polyurethane 136. They are not affixed to the reinforcer.

Figure 20:
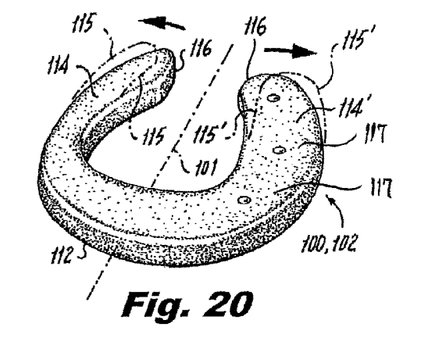
FIG. 20 is a perspective view of the therapeutic extension horseshoe of FIG. 16, highlighting its bending capability along the long axis.

FIG. 20 is a perspective view of the therapeutic extension horseshoe 100, 102, highlighting its bending capability with respect to a virtual axis 101. That is, virtual axis 101 bisects the therapeutic extension horseshoe into one half extending from anterior segment 112 through left side portion 114 to caudal end 116 on the left of the figure, and through right side portion 114' to caudal end 116 on the right of the figure.

The left ghost portions 115 and right ghost portions 115' (on both sides of each caudal end 116) represent a location into which a portion of the respective side/ends extend/retract with the lateral flexing (i.e., expanding and contracting) with natural hoof movements.

Figure 21:
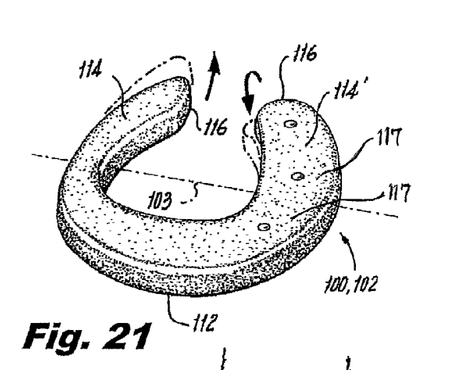
FIG. 21 is a perspective view of the therapeutic extension horseshoe of FIG. 16, highlighting its rotational capability along the short axis.

FIG. 21 is a perspective view of the therapeutic extension horseshoe 100, 102, highlighting its rotational capability along the short virtual axis 103. That is, each side portions 114, 114', including an extension, is able to flex vertically with respect to the lateral plane independently of the other, as does the natural hoof.

Figure 22:
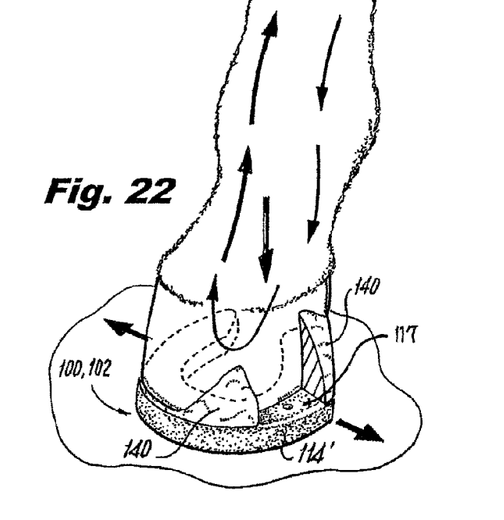
FIG. 22 is a perspective view in partial cutaway of the therapeutic extension horseshoe mounted to a hoof, illustrating the spreading capability when a direct load is placed on the shoe.

FIG. 22 is a perspective view in partial cutaway of the therapeutic extension horseshoe 100, 102 mounted to a hoof in order to illustrate the spreading capability when a direct load is placed on the shoe, and the blood flow to and from the hoof. As mentioned above, blood flow is enhanced by the natural flexing, vertically and laterally with respect to the left and right side portions of the hoof, and these natural movements are not limited in any way by attachment of the therapeutic extension horseshoe 100, 102. A build-up of adhesive 140 is shown to extend up from contact surface 118 to surround at least part of the hoof, which may be applied to the extension horseshoe by the DVM or farrier. This prevents the mare or foal from stepping on the extension part of the therapeutic extension horseshoe, which extends out from the hoof wall, and inadvertently dislodging it.

Figure 23:
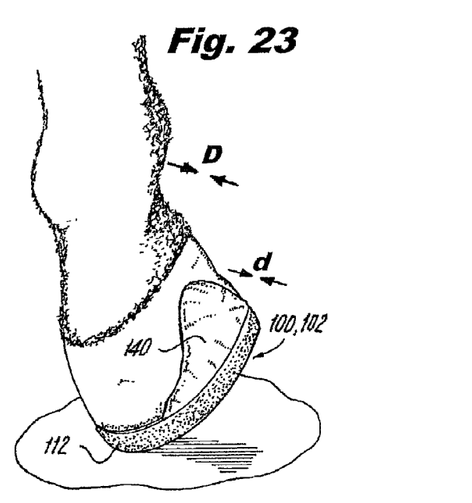
FIG. 23 is a perspective view of the therapeutic extension horseshoe mounted to the underside of the hoof during a stride, illustrating the reduced dimension of the ankle and corresponding proximal therapeutic extension horseshoe.

FIG. 23 is a perspective view of the therapeutic extension horseshoe 100, 102, affixed to the underside of the hoof during a stride. The FIG. 23 perspective illustrates the reduced dimension of the ankle and corresponding proximal therapeutic extension horseshoe.

FIG. 24 is a perspective view of a pair of legs with a toe-in problem, highlighting the installed therapeutic extension horseshoes 100, 102 and bone structure in phantom. The therapeutic extension horseshoes 100, 102, as shown, are operating to provide lateral extensions.

FIG. 25 is a perspective view of a pair of legs with a toe out problem, highlighting the installed therapeutic extension horseshoes 100, 102 and bone structure in phantom. The therapeutic extension horseshoes 100, 102, as shown, are operating to provide medial extensions.

Preferably the therapeutic extension horseshoe is formed of a certain thickness, i.e., of the moldable material. The thickness is normally defined in a range of between ⅛" to ¾" but is preferably about ⅜" to realize a desirable flexibility both in a horizontal dimension, i.e., flexibility of the distance between the caudal ends of the open heel, and in a vertical dimension, e.g., each vertical end may flex with one hoof side, for example, when stepping on a stone that contacts only part of the hoof.

The benefit of flexing and moving with the foot is achieved with the therapeutic extension horseshoe, as explained in detail above. That is, the resilient moldable material (for example, urethane or hybrid polyurethane) and the reinforcer act in the same way as in the non-therapeutic horseshoes. As mature horses benefit from the inventive horseshoe described above, the properties are even more important in horseshoes worn by young growing horses.

As described above, using extensions made of acrylic material is known. A DVM or farrier applies and builds up material around the hoof wall to create a platform, instead of using an extension horseshoe. Such method, however, can be detrimental to the integrity of the hoof wall resulting in a possible flare and wall separation. The therapeutic extension horseshoe provides support across the entire hoof, minimizing distortion to the hoof capsule.

It should be noted that in the above embodiments, the reinforcer is shown to extend into the lateral or medial extension, and connected therein to the wear inserts. The invention however, is not limited to such embodiments. That is, the reinforcer may form the shape of therapeutic extension horseshoe as in the embodiments described in cooperation with FIGS. 1-14, where only the wear insert(s)/vertical studs are disposed in the extension. In a case where the wear inserts)/vertical studs are connected to the reinforcer, prong extensions are welded at one end to the reinforcer and at its other end to each insert/stud.

As can be seen in the drawing figures, the extension part of the therapeutic extension horseshoe is exaggerated and due to the material the shoe can be modified, i.e. thickness reduced, extension reduced or beveled, in any area the vet/farrier sees fit for the individual case. It should be apparent that the vet/farrier can further shape the therapeutic extension horseshoe, and in particular the extension in order to address the needs of the young or newborn horse being treated.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A therapeutic extension horseshoe comprising a substantially u-shape, non-metallic, resilient, flexible moldable material having an anterior segment and opposing side segments with caudal ends separated at an open heel; a pliable, metal rod-like reinforcer shaped to include said anterior segment from which said opposing side segments continuously extend to said caudal ends, said reinforcer embedded in the moldable material between ungulate and contact surfaces, wherein an extension is formed in the moldable material comprising one of said opposing side segments to extend a load bearing surface formed in said one opposing side segment in order to facilitate a modification of a posture of a horse shod therewith; and at least one wear insert arranged in said extension between the ungulate and contact surfaces to minimize surface wear to the moldable material therein.

2. The therapeutic extension horseshoe as set forth in claim 1, wherein the resilient, flexile moldable material comprises one of urethane, polyurethane and hybrid polyurethane.

3. The therapeutic extension horseshoe as set forth in claim 1, wherein the at least one wear insert is constructed in a shape of a right circular cylinder, where a bottom lateral pin surface is arranged to be substantially coplanar with the ungulate surface.

4. The therapeutic extension horseshoe as set forth in claim 1, wherein the distance between the ungulate and contact surface is about ⅜".

5. The therapeutic extension horseshoe as set forth in claim 1, wherein said pliable, metal rod-like reinforcer is constructed to enable flexing such that a distance separating said caudal ends in said open heel may increase and decrease with normal hoof movement in a plane substantially horizontal to the ground and in a direction substantially perpendicular to the plane substantially horizontal to the ground.

\* \* \* \* \*